United States Patent
Bufferne et al.

(10) Patent No.: US 10,839,088 B2
(45) Date of Patent: Nov. 17, 2020

(54) METHOD FOR MANAGING EMBEDDED SOFTWARE MODULES FOR AN ELECTRONIC COMPUTER OF AN ELECTRICAL SWITCHING DEVICE

(71) Applicant: SCHNEIDER ELECTRIC INDUSTRIES SAS, Rueil Malmaison (FR)

(72) Inventors: Vincent Bufferne, Grenoble (FR); Vladimir Popovic, Grenoble (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 131 days.

(21) Appl. No.: 16/112,860

(22) Filed: Aug. 27, 2018

(65) Prior Publication Data
US 2019/0095633 A1 Mar. 28, 2019

(30) Foreign Application Priority Data
Sep. 25, 2017 (FR) ...................................... 17 58826

(51) Int. Cl.
*G06F 21/00* (2013.01)
*G06F 21/60* (2013.01)
(Continued)

(52) U.S. Cl.
CPC .............. *G06F 21/604* (2013.01); *G06F 8/61* (2013.01); *G06F 9/4881* (2013.01);
(Continued)

(58) Field of Classification Search
CPC .......... G06F 21/12; G06F 21/30; G06F 21/44; G06F 21/50; G06F 21/51; G06F 21/121;
(Continued)

(56) References Cited

U.S. PATENT DOCUMENTS 8,140,733 B2 * 3/2012 Wong ...................... G06F 21/44
710/313
8,152,628 B2 * 4/2012 Kinsley ................. G06F 21/121
463/25

(Continued)

OTHER PUBLICATIONS

French Preliminary Search Report dated May 18, 2018 in French Application 17 58826 filed on Sep. 25, 2017 (with English Translation of Categories of cited documents & Written Opinion).

*Primary Examiner* — Hosuk Song
(74) *Attorney, Agent, or Firm* — Oblon, McClelland, Maier & Neustadt, L.L.P.

(57) ABSTRACT

A method for managing embedded software modules for an electronic computer embedded in an electrical switching device for switching an electric current includes acquiring a software module including a runnable code and a service contract declaring the hardware resources required by the runnable code when it is run by the computer; installing the software module inside a host receptacle intended to form an environment for running a software module and including a memory location defined statically inside a memory of the computer and being associated with a subset of hardware resources of the computer; running the software module including a step consisting in verifying whether the operation of running of the software module respects the service contract, the running operation being allowed to continue if the service contract is respected and, otherwise, a recovery step is implemented in order to interrupt the running operation.

10 Claims, 8 Drawing Sheets

(51) Int. Cl.
*G06F 9/48* (2006.01)
*G06F 8/61* (2018.01)
*G06F 11/07* (2006.01)
*G06F 11/30* (2006.01)
*G06F 11/34* (2006.01)
*G06F 9/445* (2018.01)

(52) U.S. Cl.
CPC ........ *G06F 11/076* (2013.01); *G06F 11/0736* (2013.01); *G06F 11/0793* (2013.01); *G06F 11/302* (2013.01); *G06F 11/3013* (2013.01); *G06F 11/3423* (2013.01); *G06F 9/445* (2013.01); *G06F 11/073* (2013.01); *G06F 11/0715* (2013.01); *G06F 11/0754* (2013.01); *G06F 11/3409* (2013.01); *G06F 11/3476* (2013.01); *G06F 2201/805* (2013.01); *G06F 2201/815* (2013.01); *G06F 2201/865* (2013.01); *G06F 2201/88* (2013.01)

(58) Field of Classification Search
CPC . G06F 21/604; G06F 11/0736; G06F 11/3013
See application file for complete search history.

(56) References Cited

U.S. PATENT DOCUMENTS

| | | | | |
|---|---|---|---|---|
| 8,370,959 | B2* | 2/2013 | Gunadisastra | G06F 21/34 713/320 |
| 8,639,923 | B2* | 1/2014 | Lo | G06F 8/63 713/1 |
| 9,767,318 | B1* | 9/2017 | Dropps | G06F 21/72 |
| 10,482,265 | B2* | 11/2019 | Chari | H04L 63/1433 |
| 10,523,675 | B2* | 12/2019 | Bhabbur | H04L 63/123 |
| 2005/0257199 | A1 | 11/2005 | Johansson et al. | |
| 2008/0141240 | A1 | 6/2008 | Uthe | |
| 2009/0072022 | A1 | 3/2009 | Tripathi | |
| 2010/0031243 | A1 | 2/2010 | Jakubowski | |
| 2012/0216213 | A1 | 8/2012 | Renault | |

* cited by examiner

METHOD FOR MANAGING EMBEDDED SOFTWARE MODULES FOR AN ELECTRONIC COMPUTER OF AN ELECTRICAL SWITCHING DEVICE

The present invention relates to a method for managing embedded software modules run by an embedded electronic computer of an electrical switching device. The invention also relates to an electrical switching device comprising an embedded electronic computer programmed for the implementation of this management method.

The invention notably relates to the field of devices for interrupting an electric current, such as low-voltage circuit breakers, equipped with an embedded electronic computer for running embedded software programmes.

At the present time, such software programmes allow advanced functionalities to be implemented that improve the operation of these devices, such as control, supervision and remote management functions.

It is desirable to enable these software programmes to be developed over time and according to the needs of the users. For example, the users may choose to only use the functionalities of interest to them depending on the use for which the device is intended. They may also wish to add or to remove certain functions, if their needs change over time. This also allows the manufacturer to develop the devices throughout their lifetime, or even to offer users specific functionalities custom designed according to their particular needs. Indeed, it is not always possible to know, when a product is designed, what will be the use to which the users will put it throughout the life cycle of this product.

Such an upgradable behaviour must be able to be easily and quickly implemented by the users.

However, the functions implemented by these software programmes may relate to essential functions of the electrical device, such as protection and electrical measurement functions, for example for triggering a circuit breaker in the case of an electrical fault. These software programmes must therefore comply with the constraints of operation in real time when they are run. If such were not the case, the security and safety of operation of the device would be compromised, which is not desirable.

In a known manner, some switching devices include real-time embedded software programmes in which several functionalities may be installed in a modular fashion. However, this modularity remains limited and has a "monolithic" aspect, in the sense that the various functionalities are provided by tasks which are grouped together. In other words, these functionalities are inter-dependent, from their installation up to their execution. The user cannot install or uninstall individual functions, but only fixed sets of pre-defined functionalities. Thus, the operation of such a system remains complicated for the user. This architecture also poses a problem when the manufacturer wishes to test and certify various functionalities before offering them to users. Indeed, owing to the fact that the tasks cannot be dissociated within the same set, it is this whole set of tasks that needs to be tested. If the manufacturer wishes to test or to certify all the possible combinations of functionalities with a view to offering a wider choice to the users, then the number of sets to be tested and certified increases exponentially, so that such a task is not feasible in practice.

There do of course exist other software systems having a modular architecture, thus allowing a more flexible use. However, they do not allow a real-time behaviour to be guaranteed. Their use is therefore not desirable.

It is these drawbacks that the invention intends more particularly to overcome, by providing a device for interrupting an electric current comprising an embedded electronic computer, and an associated method of operation, in which embedded software programmes have a modular design that is easy and quick to implement by users, with no detriment to the security or safety of operation of the device.

For this purpose, the invention relates to a method for managing embedded software modules for an embedded electronic computer of an electrical switching device for an electric current, this method comprising steps:

a) for acquisition, by a system for managing software modules of the electronic computer of the switching device, of a software module comprising a runnable code and a service contract declaring the hardware resources required by the runnable code when it is run by the electronic computer;

b) for installation of the software module within a host receptacle, by the management system, this host receptacle belonging to an assembly of host receptacles each intended to form a run-time environment for a software module, each receptacle comprising, for this purpose, a memory location statically defined within a memory of the electronic computer and being associated with a sub-assembly of hardware resources of the electronic computer;

c) for execution of the software module by the electronic computer; in that the step c) comprises, when the software module is executed, a step consisting in verifying, by means of the management system, whether the execution of the software module complies with the service contract of this software module, in that the execution is authorized to proceed if it complies with the service contract and in that, if the execution of the software module is identified as not complying with the service contract, a recovery step is implemented with the aim of interrupting the running of the software module by the electronic computer.

Thus, the invention allows both the modular aspect of the embedded software and the compliance with the real-time execution constraints of this software to be reconciled.

As previously explained, the modular structure of the software modules is permitted, in part, by virtue of the receptacles. This modular structure is also permitted by the service contract, and also by the mechanisms allowing it to be verified whether the service contract is adhered to. The service contract also allows the real-time operation of the software modules to be ensured.

As the software modules have a modular structure, they can be installed or uninstalled dynamically. The software management of the device is facilitated for the users. This modular structure also offers more possibilities for upgrading the operation of the device over time. Moreover, by preserving the real-time operation of the embedded software programmes, detrimental effects on the operational security and safety of the device are avoided.

According to advantageous, but not obligatory, aspects of the invention, such a method may incorporate one or more of the following features, taken in isolation or according to any technically admissible combination:

The method comprises, prior to the step b), a prior step for verification of the service contract of the software module, the installation of the software module being refused if the hardware resources required by the service contract are not compatible with the hardware resources offered by the available receptacles.

In parallel with the step c), at least one separate second software module installed in another separate receptacle is also being run, a second step consisting in verifying whether the running of this second software module complies with the service contract of this second software module also being implemented.

During the step c), the running of the code comprises the execution of several tasks in real time by a logic processing unit of the electronic computer, each task being associated with a predefined frequency of execution and the execution of the tasks by the logic processing unit is regulated by a first sequencer implemented by the management system then by a second sequencer implemented by a real-time operating system of the electronic computer, the first sequencer selectively authorizing the execution of the tasks waiting to be executed depending on their frequency of execution by assigning them an execution priority level for the second sequencer which depends on the frequency of execution defined for this task.

A first group of tasks assembles tasks associated with a predefined first frequency of execution, a second group of tasks assembles tasks associated with a predefined second frequency of execution lower than the first frequency of execution and, when the software module is run, the execution of the tasks belonging to the first group is triggered by the sequencer when each periodic timing signal is received and the execution of the tasks belonging to the second group is triggered periodically by the first sequencer, the tasks belonging to the second group having a lower priority than the tasks belonging to the first group.

The switching device is connected to an electrical installation for interrupting an AC electric current within this electrical installation, the frequencies of execution being chosen as a function of the frequency of the AC electric current.

The recovery strategy implemented during the recovery step in the case of violation of the service contract of a software module comprises the interruption of the running of the software module.

The recovery strategy implemented during the recovery step in the case of violation of the service contract of a software module is chosen as a function of a criticality value of the runnable code declared in the service contract of this software module.

According to another aspect, the invention relates to a device for switching an electric current comprising an embedded electronic computer designed to control the operation of the switching device and intended to receive embedded software modules, the electronic computer comprising an assembly of host receptacles each intended to form an environment for execution of a software module, each receptacle comprising for this purpose a memory location statically defined within a memory of the electronic computer and being associated with a sub-assembly of hardware resources of the electronic computer, this electronic computer furthermore implementing a management system programmed for implementing steps:

a) for acquisition of a software module comprising a runnable code and a service contract declaring the hardware resources required by the runnable code when it is run by the electronic computer;

b) for installation of the software module inside of one of the receptacles;

c) for running of the software module by the electronic computer, the step c) comprising, when the software module is run, a step consisting in verifying whether the running of the software module complies with the service contract of this software module, the run being authorized to proceed if the service contract is adhered to and, if the running of the software module is identified as not complying with the service contract, a recovery step is implemented with the aim of interrupting the running of the software module by the electronic computer.

According to advantageous, but not obligatory, aspects of the invention, such a switching device may comprise the following feature: the electronic computer is furthermore programmed for implementing, before the step b), a prior step for verification of the service contract of the software module, the installation of the software module being refused if the hardware resources required by the service contract are not compatible with the hardware resources offered by the available receptacles.

The invention will be better understood and other advantages of the latter will become more clearly apparent in light of the description that follows, of one embodiment of a method for managing software modules within a switching device for an electric current, presented solely by way of example and with reference to the appended drawings, in which.

Figure 1:
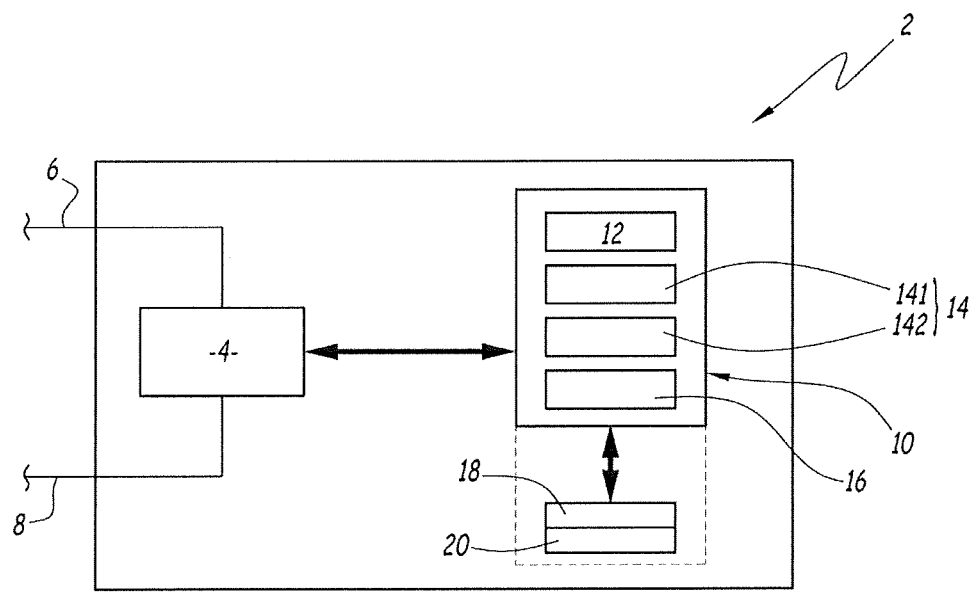
FIG. 1 is a schematic representation of a switching device equipped with an embedded electronic computer according to the invention.

FIG. 1 shows a switching device 2 for an electric current, comprising a current interruption unit 4 and input/output terminals 6 and 8 for an electric current. The device 2 is designed to be electrically connected, by means of the terminals 6 and 8, to an electrical installation, such as an electrical distribution circuit.

The current interruption unit 4 is designed to interrupt, in a reversible manner, the flow of an electric current between the terminals 6 and 8, for example by means of separable electrical contacts whose movement is controlled by a controllable actuator.

The terminals 6 and 8 here are illustrated schematically. Their exact number may vary, notably depending on whether the electric current is a single-phase or polyphase current. For example, the device 2 is a single-pole device or a quadrupole device.

In this example, the device 2 is a low-voltage circuit breaker, designed to operate with a DC or AC electric current. As a variant, it may be a high-voltage circuit breaker, or a power relay, or a switch, or any other equivalent switching device.

The device 2 also comprises an onboard electronic computer 10, which is notably designed to control the operation of the device 2, here by means of embedded software programmes.

For example, the computer 10 is designed to control the current interruption unit 4, by acting on the controllable actuator previously mentioned.

The computer 10 comprises a logic processing unit 12, a computer memory 14 and a user interface 16, connected together via an internal data bus, not shown.

The logic unit 12 here is a microprocessor or a programmable microcontroller.

In this example, the memory 14 comprises a non-volatile memory 141 and a working memory 142. For example, the memory 141 comprises a non-volatile memory module, of the Flash type or any other equivalent technology. Here, the working memory 142 is of the RAM (for "Random Access Memory") type.

The user interface 16 is designed to allow a user to interact with the computer 10 and, notably, to add and to remove software modules.

For example, the interface 16 comprises a controllable display screen, here of the liquid crystal type, together with means for inputting data, such as buttons or a touch screen.

The interface 16 may also comprise data connection means allowing a wired or wireless datalink to be established between the computer 10 and external data processing equipment, in order to provide the facility for downloading software modules. For example, the interface 16 comprises a wired connector of the USB or serial port type. The interface 16 may also comprise a radio interface of the NFC (for "near-field communication") type or of the UNB (for "ultra-narrow band") type, or else using any appropriate technology.

The interface 16 may furthermore comprise a reader capable of reading the content of a portable recording medium, such as a memory card or an optical disk, here again to allow software modules to be downloaded.

The computer 10 here is accommodated with the unit 4 inside the same housing of the device 2. The interface 16 is, preferably, positioned so as to be accessible by a user from outside of this housing.

The memory 14 stores runnable software instructions for the operation of the computer 10 and of the device 2 when these instructions are run by the logic unit 12. These instructions for example take the form of one or more embedded software programmes.

During its operation, the computer 10 is thus designed to execute, by virtue of runnable software instructions, a real-time operating system 18 and a management system 20 for software modules. More precisely, in this example, the management system 20 is run within the operating system 18.

In a known manner, the operating system 18 has the function of managing the access of computer programmes to the hardware resources of the computer 10 while at the same time ensuring the execution of these computer programmes in real time.

In the sense of the present description, a computer system is said to be "real-time" when it comprises means allowing the execution of a task to be guaranteed with an execution time of less than a predefined duration.

The operating system 18 here comprises a spatial separation function.

Figure 3:
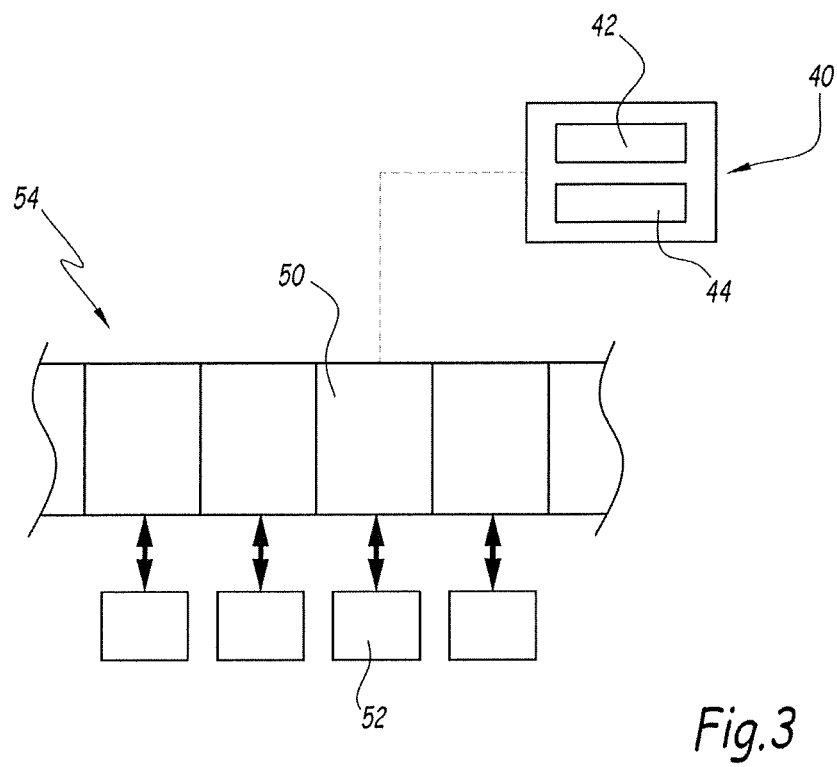
FIG. 3 is a simplified diagram of a software module and of a receptacle for receiving this software module and implemented by the management system in FIG. 2.
Figure 2:
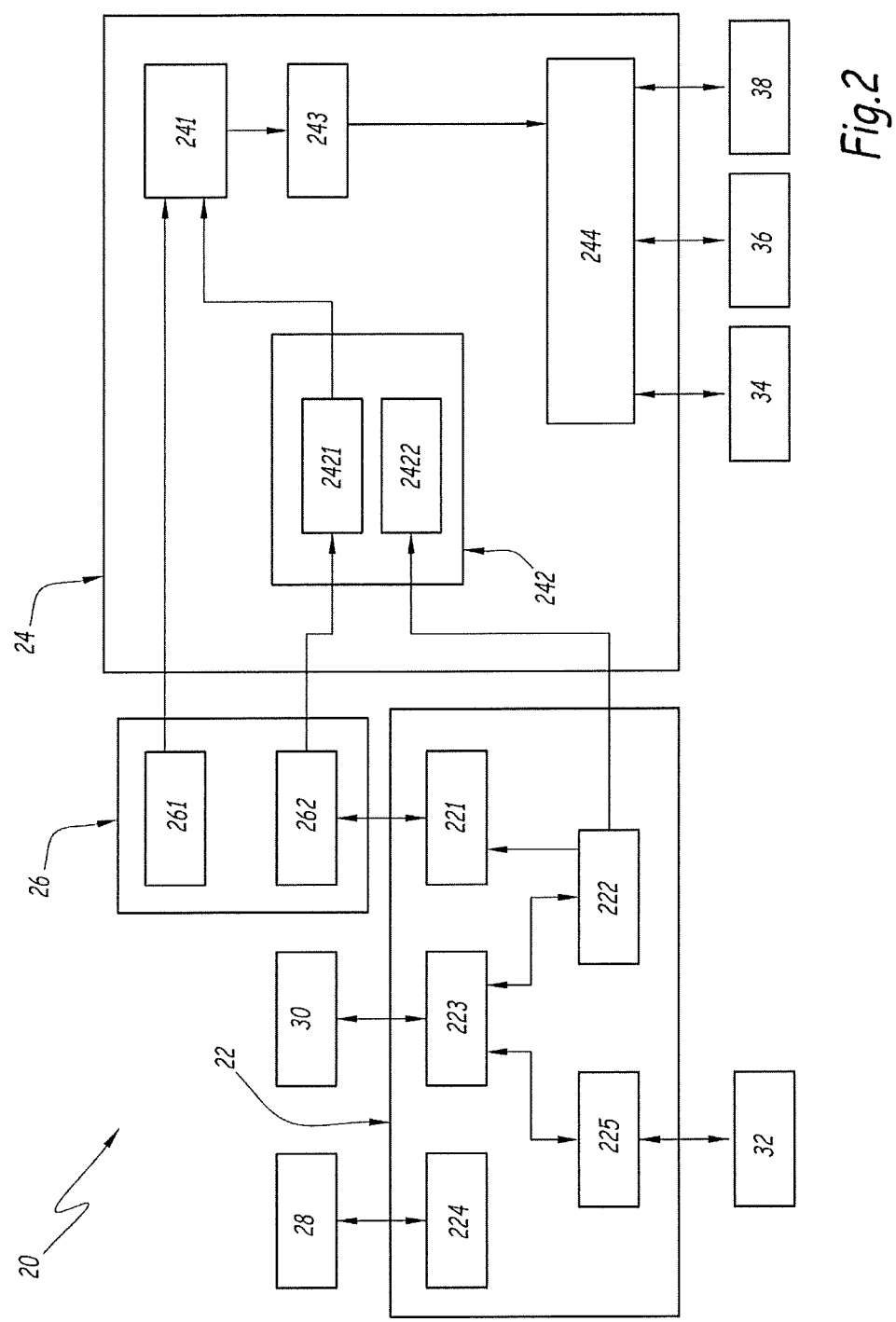
FIG. 2 is a block diagram of a system for managing software modules implemented by the electronic computer in FIG. 1.
Figure 4:
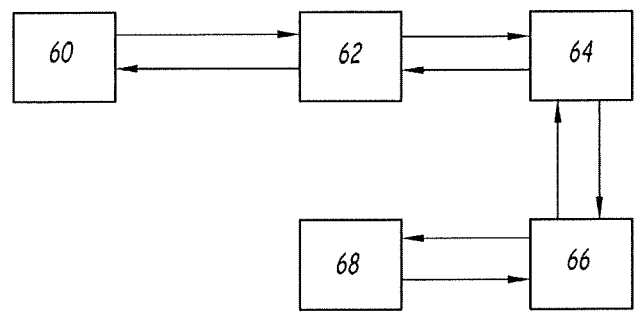
FIG. 4 is a block diagram of a state machine associated with a software module in FIG. 3.

FIGS. 2 to 4 show one example of the management system 20.

The management system 20 has the function of allowing the execution of one or more software modules in real time by the computer 10, while at the same time allowing these software modules to be installed and uninstalled dynamically, as explained in the following. Thus, these software modules may be loaded or unloaded "live" and are said to be "pluggable".

In the following, the software modules carry the reference "40". For the sake of simplicity, only one module 40 is described, in a generic manner, although in practice several different modules 40 may be used simultaneously in the system 20.

For example, each software module 40 is a data file able to be stored in the memory 14.

Each software module 40 here comprises executable instructions 42, or runnable code, designed to provide the implementation of a predefined function of the device 2 when they are run by the logic unit 12. In particular, here, these functions are based on one or more predefined elementary tasks or routines.

Each software module 40 also comprises a service contract 44, which describes the dynamic behaviour of the module 40 when it is run and, notably, defines the resources required by the module 40 during the execution of the runnable code 42. Preferably, these required resources correspond to a maximum value of resources required in an extreme case, referred to as "worst case scenario".

In particular, the service contract 44 contains a declaration of the maximum level of use of processing resources of the logic unit 12. This information allows the maximum run time required for the execution of the corresponding tasks by the unit 12 to be determined.

The service contract 44 also contains declarations which indicate the requirements of the module 40 relating to other types of hardware resources of the computer 10 and/or of the system 20 and/or of the device 2, notably when this involves hardware resources which are limited within the device 2 and which must be supervised in order to avoid conflicts between the various modules 40.

For example, the service contract 44 contains declarations relating to the maximum size of RAM memory used by the module, or else the maximum number of configuration parameters managed by the module 40.

Advantageously, the service contract 44 furthermore contains a declaration relating to the level of criticality of the functions implemented by the module 40.

For example, if the module 40 implements a function relating to the safety of the device 2, notably relating to the electrical protection, then its level of criticality is higher than that of a module 40 which implements a function of less importance, such as a measurement function.

Preferably, the service contract 44 is recorded in the form of a data file in a serial data format readable by machine.

By way of illustrative example, the service contract 44 here comprises a data file in the JSON (for "JavaScript Object Notation") format. Other formats are however possible, notably the XML (for "Extended Markup Language") format. Here, the declarations are recorded in the service contract 44 in the form of data variables, such as numerical values, Boolean values and/or strings of alphanumeric characters. As a variant, the service contract 44 may also take a binary form or have a specific encoding.

For example, the service contract 44 is generated when the runnable code 42 is written and developed.

Within the system 20, the modularity of the embedded software is provided by virtue of an assembly of host receptacles 50, each intended to receive one of the software modules 40. These receptacles 50 are also referred to as "slots".

The receptacles 50 are data structures designed to receive a software module 40 and to form a run-time environment for this software module 40.

For example, each receptacle 50 comprises a memory location, also called a container, defined statically inside an area 54 of the memory 14. More precisely, each receptacle 50 defines a predefined memory partition with a predefined memory size reserved inside the area 54.

Each receptacle 50 furthermore defines an assembly of predefined tasks, an assembly of software objects allowing interaction with other system software modules implemented by the operating system 18 and a library of functions usable by the software module 40 hosted in this receptacle 50.

Thus, each receptacle 50 is associated with a sub-assembly 52 of hardware resources of the computer 10. For example, the resources of a sub-assembly 52 are only accessible by the module 40 which is hosted in this receptacle 50.

The receptacles 50 therefore allow a spatial partitioning to be set up in order to isolate the software modules 40 from one another. Here, this partitioning is carried out by the management system 20, by virtue of underlying mechanisms provided by the operating system 18, in particular by virtue of the spatial separation function. The modules 40 may therefore be installed or uninstalled live, with no impact on the operation of the other modules 40.

The precise nature of these partitioning mechanisms depends on the type of operating system 18 used and also on the architecture of the unit 12. Here, there are mechanisms of the "partitioning" type provided by the operating system 18 in real time. For example, as a variant, the partitioning mechanism is based on a virtual addressing technique known as "Virtual Address Space".

Thus, in the system 20, a module 40 cannot access the data or the code belonging to the other modules 40 or to other software programmes running on the computer 10. A module 40 cannot use more memory resources than those that are statically allocated within the receptacle 50. The receptacles 50 therefore participate in the modular aspect of the system 20.

Each receptacle 50 can have several distinct states, and notably a state in which a module 40 is hosted in the receptacle 50, and another state in which it does not host any module 40.

In this example, as illustrated in FIG. 4, each receptacle 50 may have five different states. The reference "60" denotes a state in which the receptacle 50 is empty. The reference "62" denotes a "reserved" state, in which no module 40 is hosted, but where the receptacle 50 is reserved with a view to the future addition of a new module 40. It is not therefore available for accommodating modules 40 other than that for which it is reserved. The reference "64" denotes a "loaded" state in which a module 40 is hosted in this receptacle 50 but is not started, for example since this module 40 has been stopped or because it has not been able to obtain a valid license, or that its initialization has failed. The reference "66" denotes an "initialized" state in which the module 40 is hosted and has been started, but is not being run. For example, the module 40 is in a suspended state, or its execution has been interrupted following a malfunction. Finally, the reference "68" denotes a state in which the module 40 is being run.

The transitions between these states of the receptacle 50 here are provided by predefined functions. In this example, the transition between the states 66 and 68 occurs upon starting or, alternatively, when halting the execution of the module 40. The transition between the states 66 and 64 is carried out by giving an order to switch off the process implemented by the module 40 or, conversely, by granting a license and by initializing this process. The transition between the states 62 and 64 is carried out by loading or, conversely, by unloading the module 40, for example from one area of the memory 14. The transition between the states 60 and 62 is carried out by validating and accepting the service contract of the module 40 and by allocating the hardware resources of the receptacle 50 for the execution of this module 40. Conversely, the transition between the states 62 and 60 is carried out by freeing up the resources of the receptacle 50 and by rendering the receptacle 50 available once more for another module. The transition from the other states to the state 62 may also be implemented by sending an order to reset the receptacle 50.

The operation of the system 20 is provided by virtue of a certain number of software components. As illustrated in FIG. 2, the system 20 notably comprises a component 22 for supervising the modules 40 and a sequencer 26. The reference "24" here denotes the software components implemented during the operation of a module 40.

For example, the sequencer 26 is implemented as a task executed by the operating system 18. This execution is for example carried out periodically with a fixed frequency of execution.

The system 20 also comprises software components providing auxiliary functions.

By way of example, the system 20 here comprises several auxiliary software components, amongst which is a component 28 for managing licenses, a component 30 for verifying and for managing digital signatures, a component 32 providing the access to a file server, a component 34 for managing events and alarms, a component 36 providing the access to peripheral hardware devices of the computer 10 such as measurement sensors integrated into the device 2, and a component 38 for managing configuration parameters. As a variant, some of these auxiliary components may be omitted.

The component 22 is notably programmed so as to provide the loading of the modules 40 into the receptacles 50 and for controlling the running of the corresponding code 42 via the sequencer 26, whose operation is described in the following. For example, the component 22 is programmed to acquire the modules 40, from the interface 16 or from the file system 32, then to add the corresponding code into the memory 14.

In this example, the component 22 comprises:

- an interface 221 connected to the sequencer 26 and capable of requesting the sequencer 26 to start or to stop the execution of the code 42 of a module 40 installed in a receptacle 50;
- an interface 222 for managing receptacles 50, notably capable of providing the functions for loading and unloading the modules 40, for registering and for de-referencing the modules 40, and for starting and stopping the execution of a receptacle 50;

an interface 223 notably designed to manage the acquisition and the access to the service contract 44 and to manage the acquisition of the modules 40 from the file server 32, together with the verification of their digital signature, where relevant;

an interface 224 for access to the license manager 28;

an interface 225 for access to the file server 32.

The sequencer 26 comprises a component 261 for managing the sequencing of the tasks, together with a component 262 for monitoring and controlling tasks to be executed in real time.

The component 24 here comprises a component 241 for managing the tasks allowing the synchronization of the tasks in real time, a memory management component 243 designed to manage the access of the module 40 to the memory 14, an interface 244 for accessing the auxiliary components 34, 36 and 38. The component 24 also comprises a task manager 242 which includes an interface 2421 for access to the sequencer 26 and an interface 2422 for managing the receptacle 50.

The interfaces described hereinabove are for example provided by virtue of an assembly of application programming interface functions, also denoted "API". The connections between interfaces and/or software components described hereinabove are for example provided by virtue of software means for inter-process communications.

Figure 5:
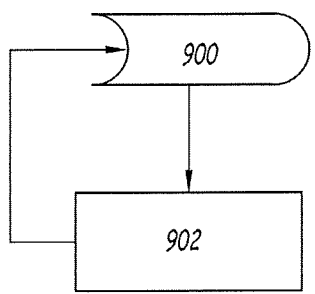
FIGS. 5 and 6 are flow diagrams illustrating a method of operation of a sequencer of the management system in FIG. 2.
Figure 6:
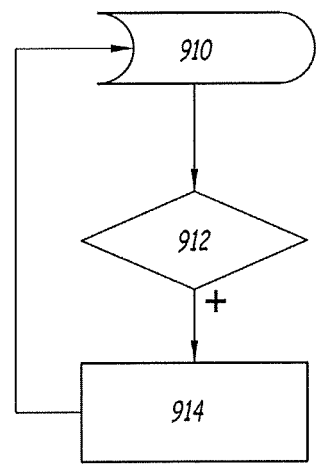

FIGS. 5 and 6 illustrate one aspect of the operation of the sequencer 26. The sequencer 26 here is distinct from the sequencer specific to the operating system 18.

The role of the sequencer 26 is to periodically trigger the execution of the tasks implemented by the modules 40 when these modules are in operation. For this purpose, the sequencer 26 uses a timing signal, such as a clock signal. Here, this timing signal is provided by a clock specific to the system 20. As a variant, this signal may be acquired from outside of the system 20.

In the following, unless otherwise stated, it is understood that the tasks implemented by the modules 40 are real-time tasks.

In this example, the sequencer 26 is programmed to process the tasks waiting for execution differently depending on their execution timing.

For example, each task is associated with a predefined frequency of execution, also referred to as execution rate. The sequencer 26 is programmed for selectively authorizing the execution of the tasks waiting for execution according to their frequency of execution and for assigning them an execution priority level which depends on the frequency of execution defined for this task. The sequencer of the operating system 18 subsequently organizes the execution of said tasks according to this execution priority level.

For example, a first group of tasks is defined which groups tasks intended to be executed with a first frequency of execution. Here, the period of execution corresponding to this frequency is referred to as basic period and is denoted $\sigma_1$.

In a similar manner, one or more other groups of tasks are defined, referred to as secondary groups, each assembling tasks whose execution is intended to be launched with a respective frequency of execution different from the first frequency. The respective values of periodicity of execution of these secondary groups are here generically denoted by the reference $\sigma_n$, where "n" denotes an integer number greater than or equal to 2.

For example, the tasks belonging to the n-th secondary group, or group of order n, are intended to be executed with a lower frequency than the frequency of execution of the tasks of the group of order n−1. Thus, the period $\sigma_n$ is strictly greater than the period $\sigma_{n-1}$.

In this example, by way of illustration, a first group is defined associated with a first period $\sigma_1$ equal to 10 ms, together with four secondary groups, with respective execution periods denoted $\sigma_2$, $\sigma_3$, $\sigma_4$ and $\sigma_5$ and respectively equal to 20 ms, 100 ms, 200 ms and 1 second.

As a variant, the number of secondary groups, together with the values of period associated with them, may be different from those described, and the description of the sequencer 26 and of its operation, presented with reference to the embodiments in these FIGS. 5 and 6, is applicable in a manner analogous to these other cases.

For example, a specific timing signal is generated, for each of the groups, so as to facilitate the synchronization of the sequencer 26. When the secondary periods $\sigma_n$ are multiples of the basic period $\sigma_1$, secondary timing signals associated with the secondary periods $\sigma_n$ may be generated starting from the timing signal associated with the basic period $\sigma_1$.

In a particularly advantageous manner, the values of the execution frequencies, and hence the values of the basic period and/or of the secondary periods described hereinabove, are chosen as a function of the frequency of the electric current flowing through the terminals 6 and 8 of the device 2 when this current is an AC current. For example, the device 2 is used in an electrical installation whose frequency of oscillation of the AC current is equal to 50 Hz. Then, in this example, the basic period $\sigma_1$ equal to 10 ms corresponds to half of the period of oscillation of the AC current.

Advantageously, the priority of execution of the tasks belonging to a group associated with a high frequency of execution is higher than the priority of execution of the tasks belonging to the groups associated with a lower frequency of execution. For example, the tasks of the group of order n have a lower priority of execution than the tasks of the group of order n−1. The tasks of the main group have a lower priority of execution than that of the tasks belonging to the secondary group(s).

In practice, here, this priority is assigned to each of the tasks by the sequencer 26. This priority defines the priority with which the tasks will be processed by the sequencer of the operating system 18.

In other words, the sequencer 26 assigns to said tasks an execution priority level which depends on the frequency of execution defined for this task, this priority here being higher, the higher the frequency of execution.

As illustrated in FIG. 5, the sequencer 26 gives priority to processing the tasks belonging to the first group.

Thus, during a step 900, the sequencer 26 waits for the receipt of the timing signal associated with the basic period $\sigma_1$. Indeed, the timing signal is preferably adjusted so as to correspond to the period $\sigma_1$. In this example, the timing signal is generated every 10 ms.

Once this first timing signal is received, then, during a step 902, the sequencer 26 authorizes the execution of all the real-time tasks of the first group which are waiting to be executed.

The method then returns to the step 900 and the sequencer 26 once again waits for the receipt of the timing signal before being able to authorize the execution of the new tasks associated with this first group which had meanwhile been put into standby for execution by the rest of the system 20.

In practice, at this stage, the fact that the sequencer 26 authorizes the execution of several tasks does not necessarily mean that these tasks will immediately be executed by the unit 12, given that the access to the unit 12 depends on the behaviour of the main sequencer managed by the operating system 18. Nevertheless, as the operating system 18 is a real-time system, it is thus guaranteed that the execution of these tasks will be carried out within a predefined period of time. The execution in real time of these tasks is therefore guaranteed.

In the sense of the present description, owing to the mechanisms of operation of the sequencer 26 and of the sequencer specific to the operating system 18 described hereinabove, the term "execution" or "running", when it is applied to the module 40 itself, does not necessarily imply that the tasks or processes defined by the runnable code 42 of this module 40 are being executed by the logic unit 12. For example, here, "running the module 40" is understood to mean that the system 20 accepts to take responsibility for the corresponding tasks with a view to their execution by the unit 12, but that the precise time when the corresponding tasks are actually executed by the unit 12 ultimately depends on the operation, notably, of the sequencer 26.

FIG. 6 illustrates one example of the way in which the sequencer 26 processes the tasks associated with one of the secondary groups, such as the group of order n.

The method begins during an initial step 910.

During a step 912, the sequencer 26 verifies whether it can authorize the execution of the tasks of the group in question. For example, the sequencer 26 awaits the timing signal corresponding to the period $\sigma_n$.

If such is the case, then, during a step 914, the sequencer 26 authorizes the execution of the tasks of the group in question.

In practice, at this stage, several tasks belonging to different groups have received the authorization for execution by the sequencer 26. It is the sequencer of the operating system 18 that is responsible for setting the order of the execution of these tasks on the unit 12, according to their priority, while at the same time trying to guarantee the execution in real time of these tasks.

Once the execution of all the tasks of the group is launched, the method returns to the step 910 with a view to authorizing the execution of the new tasks associated with this group which meanwhile had been put into standby for execution by the rest of the system 20.

The steps 910 to 914 of this method are thus repeated in a loop, and implemented for each of the secondary groups, for example in a conjoined manner.

With the design described hereinabove, the sequencer 26 allows the modules 40 to be run according to a sequential approach, which ensures a better control of the execution of these tasks. Thus, it is not necessary for the programmes implemented by the runnable code 42 of the software modules to be based on an event-driven approach.

In practice, owing to the fact that the tasks of the group of order n−1 have a higher execution priority than the tasks of the group of order n, the sequencer of the operating system 18 guarantees that the tasks of the group of order n will not be executed for as long as the tasks of the n−1 group have not finished being executed.

However, optionally, it is also possible to wait until the tasks of the group of order n−1 have finished their execution before authorizing the execution of the tasks of the group of order n.

Thus, the method hereinabove is advantageously modified so that, during the step 910, the sequencer 26 waits until the unit 12 has finished executing all the tasks of the preceding group before going to the step 912. In other words, the execution of the tasks belonging to the group of order n is only authorized when the execution of the tasks of the preceding group has ended.

Thus, when the method is run for the n-th group, the sequencer 26 waits until all the tasks of the group of order n−1, in other words the tasks associated with the period $\sigma_{n-1}$, have finished being executed. In particular, when the method is run for the secondary group associated with the period $\sigma_2$, the sequencer 26 waits until all the tasks of the first group have finished being executed.

Figure 7:
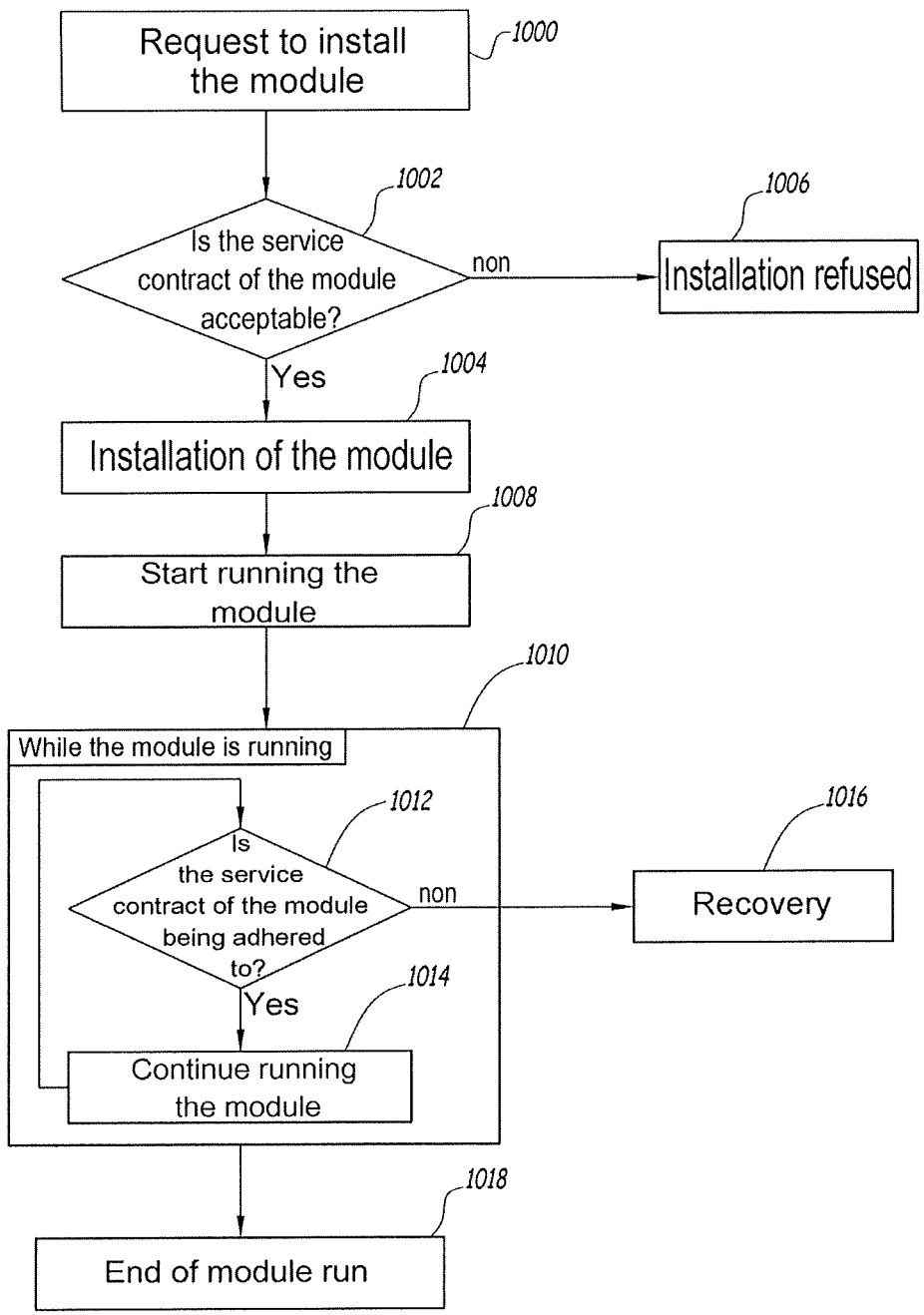
FIG. 7 is a flow diagram of a method of operation of the system in FIG. 2.

FIG. 7 shows one example of a method of operation of the system 20, for installing and running a module 40.

Initially, this module 40 is not hosted by any of the receptacles 50.

Firstly, during a step 1000, a request for installation of the module 40 is received by the system 20.

For example, the user sends this request to the system 20 via the interface 16. The module 40 is downloaded into the memory by the user, if it is not already present inside of the latter. The system 20 can then interact with this module 40, notably for acquiring the corresponding service contract 44.

Subsequently, during a step 1002, the system 20 verifies whether the corresponding service contract 44 is acceptable, notably in the light of the available hardware resources offered by the receptacles 50 which are still in the free state.

If the corresponding service contract 44 is considered as acceptable, for example because there is at least one free receptacle 50 whose resources 52 are sufficient to accommodate the needs of the module 40 such as declared in its service contract 44, then the installation of the module 40 is accepted and is implemented during a subsequent step 1004 for installation of the module 40 in the free receptacle 50.

In the opposite case, the installation of the module 40 is refused and the method ends during a step 1006.

Once the module 40 has been correctly installed in the receptacle 50, it is then run during a step 1008.

During a step 1010, the instructions 42 of the module 40 are executed, for example in a cyclical manner by virtue of the intervention of the sequencer.

Throughout this step 1010, during the execution of the module 40, the system 20 ensures, here during a step 1012, that the module 40 complies with its service contract 44. In other words, the system 20 verifies that the module 40 does not request nor consume hardware resources of the computer 10 that would be greater than the needs declared in its service contract 44.

If the module complies with the service contract, then, during a step 1014, the execution of the module 40 is authorized to proceed in a normal manner. The step 1012 is then once again carried out, for example periodically, for as long as the step 1010 continues.

Conversely, if the step 1012 highlights that the module 40 is not complying with the service contract, then the system 20 implements a recovery strategy during a step 1016.

The step 1016 allows the system 20 to be reset into a stable state as quickly as possible, in such a manner that the operation of the other modules 40 is not impacted negatively by the defective behaviour of the module 40 which has not complied with its service contract.

As explained with reference to FIG. 14, this recovery strategy may be accompanied by a forced termination of the defective module 40.

Lastly, the running of the module 40 ends normally, for example because the module 40 has finished its mission normally or because it has received a command to stop. The step 1010 then terminates and the method ends during a step 1018.

The steps 1000 to 1018 previously described here are implemented in parallel for each of the modules 40 that are being run.

Figure 8:
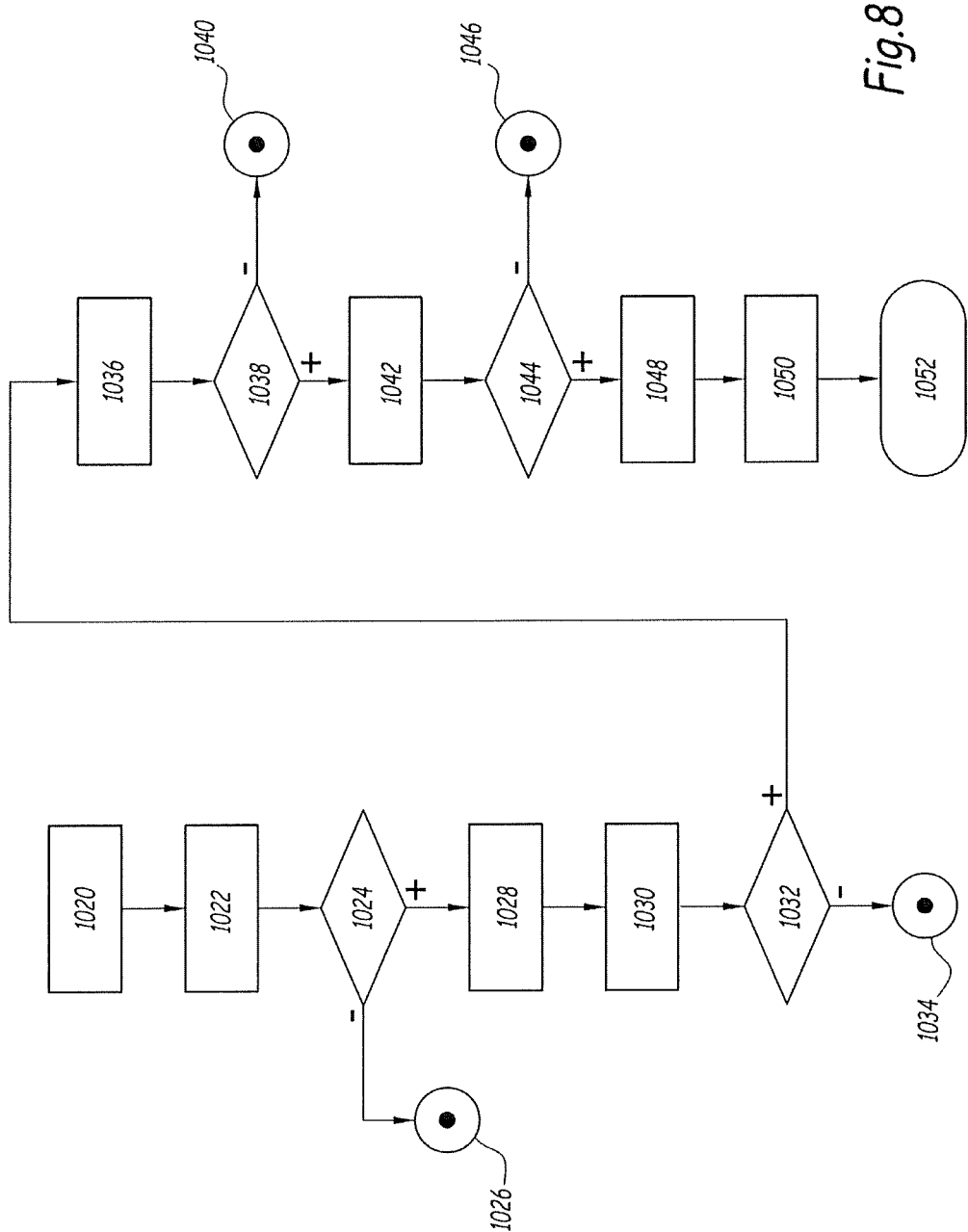
FIG. 8 is a flow diagram of a method for verification of a service contract associated with a software module implemented during the method in FIG. 7 when a software module is installed.

FIG. 8 shows one example of implementation of the steps 1002, 1004 and 1008 for verifying the service contract 44 of a module 40 when its installation has been requested.

Initially, during a step 1020, the content of the service contract 44 of the module 40 is loaded by the component 30 then read automatically by the manager 223 of the component 22.

During a step 1022, the system 20 acquires the declarations recorded in the service contract 44, and notably those relating to the processing resources required by the module 40.

These declarations are compared, during a step 1024, with the available resources offered by the receptacles 50 of the system 20 which are declared as available, in other words which are in an empty state.

If no suitable receptacle 50 can be found, for example since none of the free modules 50 is able to offer the resources requested by the service contract 44, then the verification method ends, during a step 1026, by the rejection of the service contract. For example, the step 1006 for refusal of installation of the module 40 is then implemented.

On the contrary, if a suitable receptacle 50 is available, then, during a step 1028, this receptacle 50 is reserved. For example, the manager 223 automatically updates a list of receptacles 50 available within the system 20.

Subsequently, during a step 1030, the module 40 is loaded into the corresponding receptacle 50. Advantageously, the compatibility of the module 40 may be verified at this stage.

If the module 40 is identified as not being compatible, then the method proceeds, during a step 1032, by the rejection of the module. For example, the step 1006 for refusal of installation of the module 40 is then implemented.

Optionally, if the module 40 is accepted, then its license is automatically verified during a step 1036, here with the aid of the interface 224 and of the component 28. This allows the usage rights of the module 40 to be verified.

If, during a step 1038, the license of the module 40 is identified as not being valid or if it is absent, then the method ends, during a step 1040, by the rejection of the module 40. For example, the step 1006 for refusal of installation of the module 40 is once again implemented.

Conversely, if the license is accepted, then the method continues.

Subsequently, during a step 1042, the module 40 is automatically reset, in other words set into a state allowing the programme associated with the code 42 to be run later on. For example, the manager 222 sends a command for the receptacle 50 to be reset.

If the reset command fails for one reason or another, then the method is terminated, during a step 1046, by the rejection of the module 40. For example, the step 1006 for refusal of installation of the module 40 is here again implemented.

If the reset goes ahead normally, then the receptacle 50 will be in the state 66 at the end of the step 1044 and the recurrent tasks of the code 42 are ready to be executed.

In this example, the method comprises steps 1048 and 1050 for updating monitoring information on the state of the system 20, for example provided by the component 22, so as to take into account this change of state.

The method ends normally during a final step 1052.

Figure 9:
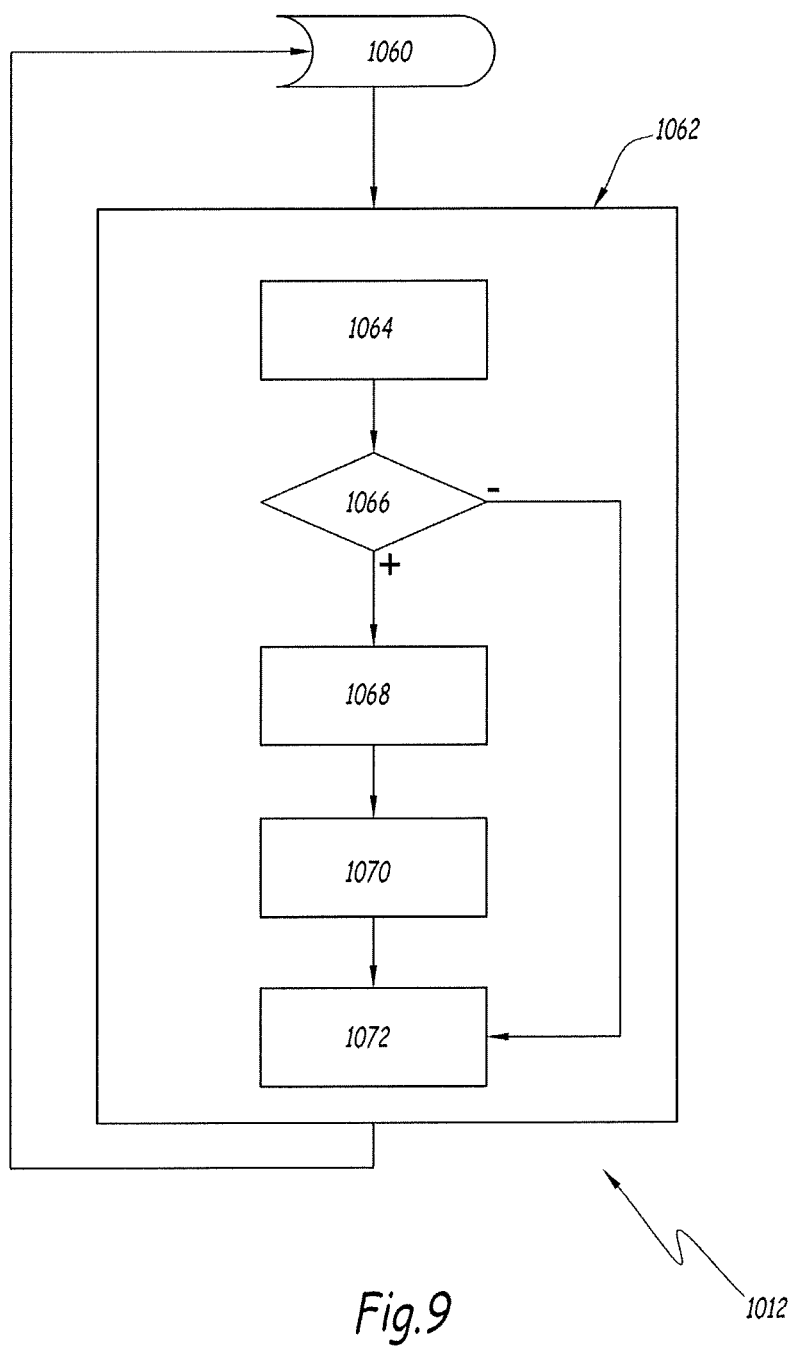
FIG. 9 is a flow diagram of a method of verification of a service contract associated with a software module implemented during the method in FIG. 7 when a software module is being run.

FIG. 9 shows one example of implementation of the step 1012 for verifying the compliance of a module 40 with the service contract 44 during the running of this module 40.

This example relates more precisely to the implementation of the verification of the compliance with the execution time of a task belonging to one of the groups of tasks, here belonging, by way of illustrative example, to the secondary group associated with the duration $\sigma_2$ equal to 20 ms.

During a step 1060, the system 20 waits until the end of the run cycle associated with the tasks of the group. The end of this run cycle is for example given by the receipt of a corresponding timing signal.

Once the system 20 has detected the end of this run cycle, then a step 1062 is implemented for each task of the group whose execution should have ended.

This step 1062 comprises a sub-step 1064, during which the system 20 automatically determines the effective time for execution of this task during the run cycle. This determination is carried out based on information coming from the core of the operating system 18. One example of such a determination is described in what follows with reference to FIGS. 11 to 13.

Once the effective execution time is acquired, then, during a sub-step 1066, this effective execution time is automatically compared with the maximum execution time declared in the service contract 44.

If the effective execution time is greater than the maximum execution time declared in the service contract 44, then the module 40 is considered to have violated its service contract 44. As a consequence, during a step 1068, a recovery strategy is implemented in order to prevent the module 40 from violating its service contract 40 again so as to avoid detrimentally affecting the operation of the other modules 40. For example, the step 1016 previously described is implemented.

Advantageously, during a step 1070, the violation is recorded in a log file.

Then, during a step 1072, the step 1062 ends, then it is iterated in order to process the next task within the group of tasks.

When no further tasks remain to be executed within the corresponding group, the step 1062 comes to an end. The method subsequently starts again at the step 1060, so as to wait for the end of the next cycle.

On the other hand, if the step 1066 demonstrates that the module 40 has complied with its service contract 44 from the point of view of the processing resources during this processing cycle, then the step 1072 is directly implemented. When there are no more tasks being executed within the corresponding group, then the step 1062 terminates.

As a variant, this step 1012 may be carried out differently, notably for verifying the compliance with the service contract relating to other hardware resources aside from the execution time. For example, the step 1012 generically denotes several verification methods run jointly for verifying the compliance with various aspects of the service contract of the same module 40.

The steps 1080 to 1090, previously described, here are implemented for each of the modules 40, independently of one another. It will notably be understood that several methods analogous to that in FIG. 9 may be implemented within the system 20 for verifying the compliance with the service contract by tasks belonging to different groups.

FIGS. 10 to 13 show one example of a method implemented for measuring the execution time of a task executed by a module 40 loaded into the system 20, for example during the step 1064 previously described.

The steps implemented in the methods in FIGS. 10 to 13 here are described sequentially in order to facilitate the understanding. However, in practice, the methods corresponding to the flow diagrams in FIGS. 10 to 13 are implemented in parallel with respect to one another.

Figure 10:
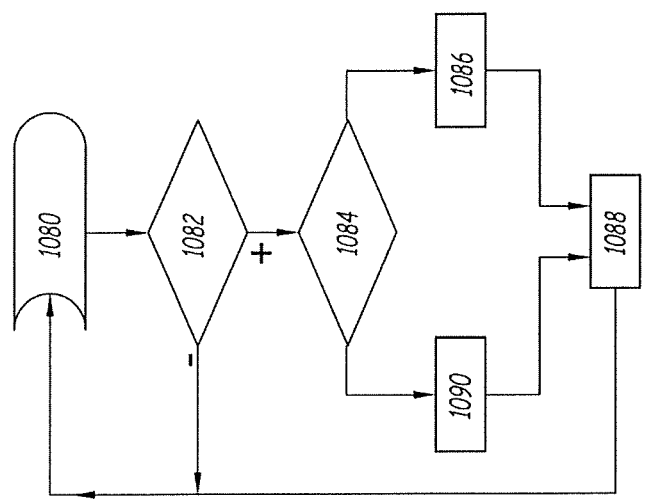

As illustrated in FIG. 10, the method comprises a first sub-assembly of steps. During a step 1080, the system monitors the sequencer of the operating system 18 in order to detect a potential context switch and waits until such a context switch occurs.

When such a context switch occurs, then, during a step 1082, the system 20 verifies whether one of the tasks involved in this context switch, either as an incoming task or as an outgoing task, is a real-time task belonging to one of the groups of tasks described hereinabove. If this is not the case, then the method returns to the step 1080.

If this is the case, on the other hand, then, during a step 1084, the system 20 automatically determines whether this real-time task is incoming, in other words it is obtaining an access to the logic unit 12, or if it is outgoing, in other words it has finished being executed by the logic unit 12.

If the real-time task is determined as being incoming, then, during a step 1086, the system 20 automatically records the moment at which the entry of the task has taken place, in other words the moment at which the access to the logic unit 12 has occurred. For example, this access time is recorded in a dedicated data structure within the memory 14. The method ends for this task during a step 1088 then subsequently returns to the step 1080 so as to be implemented once more.

If, on the contrary, the real-time task is determined as being outgoing, then, during a step 1090, the system 20 automatically calculates the time passed since the last entry. This time here is denoted T1. During this step 1090, the system 20 determines whether the task has been pre-empted following an interrupt service routine. If such is the case, the system obtains the duration $T_{isr}$ during which this task has been pre-empted. The calculation of this duration $T_{isr}$ is described in the following with reference to FIG. 13. Once the duration $T_{isr}$ is known, the system 20 calculates the difference "$T_1 - T_{isr}$" then adds this difference to the value of execution time for this task. The value of execution time is for example stored in an accumulator associated with the logic unit 12, this accumulator being accessible by the system 20.

Figure 11:
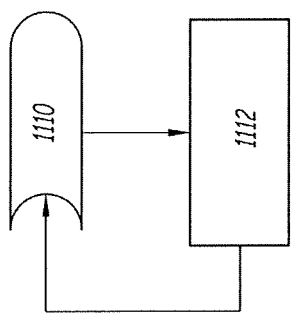

In parallel, as illustrated in FIG. 11, the system 20 waits, during a step 1110, to receive a synchronization signal associated with the execution duration threshold corresponding to the group of tasks. Subsequently, once this signal has been received, the system 20 automatically resets the accumulator for all the tasks of the group. The steps 1110 and 1112 are repeated in a loop.

This FIG. 11 describes the method for the n-th group of tasks. In practice, these steps 1110 and 1112 are implemented separately for each of the n families of tasks defined for the system 20.

Figure 12:
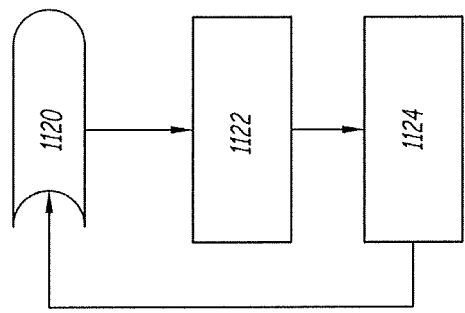
FIGS. 10 to 13 are flow diagrams of a method of measurement of the execution time of a task implemented by a software module when it is run inside of the system 2.

As illustrated in FIG. 12, in parallel, during a step 1120, the system 20 waits until information is received that an exception condition associated with the unit 12 has occurred. This information is for example a signal supplied by an interrupt routine.

Subsequently, during a step 1122, the system 20 records, for example within the memory 14, time-stamp information on the date of receipt of this exception condition, and also on the fact that such an exception condition has occurred.

In response, during a step 1124, the sequencer 26 commands the sequencer of the operating system 18 to execute a specific task, denoted T0. This task T0 corresponds to an empty task having the highest priority of execution. For example, this priority is defined statically in such a manner as to be the highest in all circumstances.

The step 1120 is subsequently once again carried out, so as to await a future exception condition.

Figure 13:
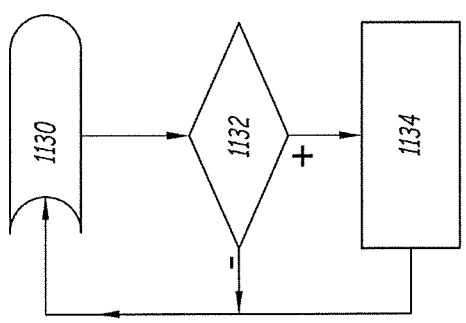

In parallel, as illustrated in FIG. 13, during a step 1130, the system 20 monitors the tasks managed by the sequencer of the operating system 18, notably for detecting the tasks that are executed by the unit 12.

As soon as the system 20 detects that the sequencer of the operating system 18 has triggered the execution of a task, then, during a step 1132, the system 20 verifies automatically whether the incoming task is the specific task T0. If such is the case, then, during a step 1134, the system 20 calculates and records the time $T_{isr}$ that has passed since the last exception condition was detected. This calculation is for example carried out by virtue of the time-stamp information recorded during the step 1122. The method then returns to the step 1100.

If, on the other hand, the incoming task is not identified as being the specific task T0, then the method returns to the step 1130.

Thus, the value of execution time contained in the accumulator corresponds to the effective execution time of the task. This value is for example acquired by the system 20, prior to the reset step 1112, in order to implement the aforementioned step 1066.

The method in FIGS. 10 to 13 is advantageously implemented when the system 20 cannot directly access the core of the operating system 18. It allows reliable information on the time of execution of the tasks by the unit 12 to be obtained, using information collected from the user space of the operating system 18.

Figure 14:
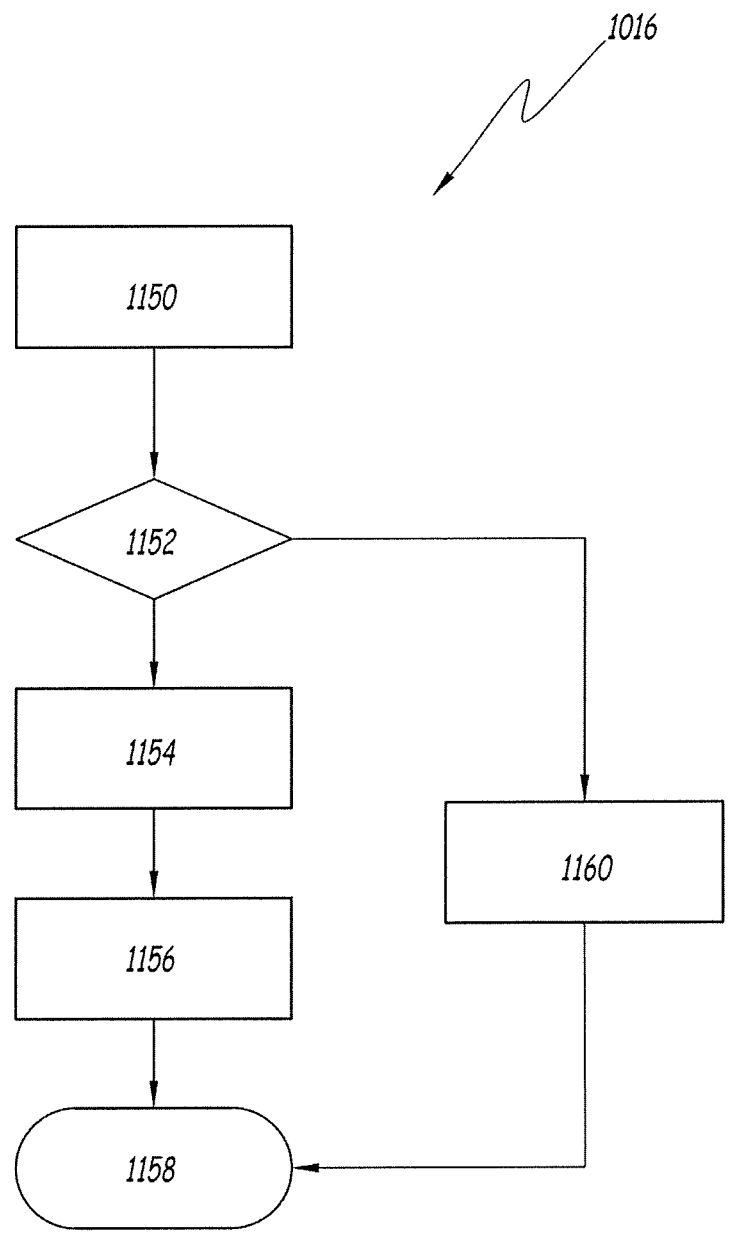
FIG. 14 is a flow diagram of a method of implementation of a recovery strategy of a software module following a violation of the service contract of this software module when it is run inside of the system 2.

FIG. 14 shows one example of implementation of the step 1016 for implementing a recovery strategy when a module 40 has not complied with its service contract during its execution. This example of a recovery step 1016 is described for the case where the violation of the service contract relates to the execution time.

Firstly, during a step 1150, all the tasks in the process of execution of the module 40 are interrupted and eliminated, for example by sending a stop signal of the "kill" type.

Then, during a step 1152, the number of attempts to restart the module 40 is compared with a predefined maximum threshold.

If the number of attempts is less than the maximum threshold, then, during a step 1154, an attempt to restart the module 40 is made. For example, new tasks corresponding to the tasks eliminated during the step 1150 are created and are initialized. The counter indicating the number of restart attempts is incremented by one unit.

Then, during a step 1156, the tasks thus initialized are taken under the control of the sequencer, allowing their execution to be carried out.

The method ends at the step 1158.

On the other hand, if, during the step 1152, the number of attempts is higher than the maximum threshold, then, during a step 1160, the execution of the module 40 is stopped.

This recovery step 1016 allows it to be ensured that, in the case of violation of the service contract of a module 40, causing an over-consumption of hardware resources by this module 40, the other modules 40 are not detrimentally affected during more than one cycle on their execution time. In other words, the recovery step 1016 allows the co-existence of several modules 40 to be guaranteed while at the same time preserving the real-time behaviour.

As a variant, the step 1016 may be carried out differently.

For example, the step 1016 may comprise, following the detection of a violation of the service contract by a module 40, the triggering of an alarm to warn the user of an operational fault, then the stopping of the defective module 40.

According to another variant, the stopping of the module 40 may be followed by the use of the next time slot for running the other modules 40 which would not have been able to run correctly owing to the violation. Once this cycle has finished, an attempt to restart the defective module 40 may be made, for example as described with reference to FIG. 14.

Furthermore, the step 1016 may also be carried out differently when the violation of the service contract relates to a hardware resource other than the execution time.

According to yet more variants, the strategy is different depending on the criticality value of the defective module, such as declared in the service contract. Indeed, the functions associated with the protection of the device 2 have a higher criticality than other functions, such as the measurement functions. Depending on the global strategy for operation of the device 2, it may be preferable, in the case of a violation, to delay as much as possible the stopping of the modules 40 implementing these functions, for example with a view to ensuring a continuity of service of the device 2. In this case, if several violations are detected, it is the module 40 having the lowest criticality that will be stopped first, for example by means of the aforementioned steps.

In other cases, safety may be the main concern forcing the device 2 to switch into a safe position, for example by forcing the opening of the separable contacts of the current interruption unit 4.

By virtue of the invention, it is possible to reconcile both the modular aspect of the software embedded in the computer 10 and the compliance with the constraints for real-time running of this software.

As the software modules 40 have a modular structure and they may be installed or uninstalled dynamically, the management software for the computer 10 of the device 2 is thus facilitated for the users. This modular structure also offers more possibilities for upgrading the operation of the device 2 over time. Moreover, by preserving the real-time operation of the embedded software applications, any detriment to the safety of operation of the device 2 is avoided.

As previously explained, the modular structure of the modules 40 is allowed in part by virtue of the receptacles 50. This modular structure is also allowed by the service contract 44, and also by the mechanisms allowing it to be verified whether the service contract is being adhered to, either at the installation or during run-time, or both, and also by the establishment of the recovery strategy in the case of violation of the service contract. The service contracts 44, together with the operation of the sequencer 26, also allow the real-time operation of the modules 40 to be ensured.

The embodiments and the variants envisaged hereinabove may be combined together in order to generate new embodiments.

The invention claimed is:

1. A method for managing embedded software modules for an electronic computer embedded in an electrical switching device for an electric current, wherein said method comprises:

a) acquiring, by a management system, software modules for the electronic computer of the electrical switching device, a software module comprising a runnable code and a service contract declaring hardware resources required by the runnable code during execution by the electronic computer;

b) installing the software module inside a host receptacle, by the management system, said host receptacle belonging to an assembly of host receptacles each intended to form a run-time environment for a software module, each receptacle comprising a memory location defined statically inside of a memory of the electronic computer and being associated with a sub-assembly of hardware resources of the electronic computer; and c) running the software module by the electronic computer, wherein the step c) further comprises, when the software module is run, verifying, with the management system, whether execution of the software module complies with a service contract of said software module, wherein the execution is authorized to proceed when it complies with the service contract and wherein, when the execution of the software module is identified as not complying with the service contract, a recovery step is implemented with an aim of interrupting the running of the software module by the electronic computer.

2. The method according to claim 1, wherein the method further comprises, prior to the step b), a prior step of verifying the service contract of the software module, the installing of the software module being refused when the hardware resources required by the service contract are not compatible with the hardware resources offered by available receptacles.

3. The method according to claim 1, wherein, in parallel with the step c), at least a second software module installed in another separate receptacle is also run, a second step of verifying whether the running of said second software module complies with the service contract of said second software module also being implemented.

4. The method according to claim 1, wherein, during the step c), the running of the code comprises the execution of several tasks in real time by a logic processing unit of the electronic computer, each task being associated with a predefined frequency of execution, and wherein the execution of the tasks by the logic processing unit is regulated by a first sequencer implemented by the management system then by a second sequencer implemented in real time by an operating system of the electronic computer, the first sequencer selectively authorizing the execution of the tasks waiting to be executed as a function of their frequency of execution and assigning them an execution priority level for the second sequencer which depends on the frequency of execution defined for said task.

5. The method according to claim 4, comprising a first group of tasks assembles tasks associated with a first predefined frequency of execution, wherein a second group of tasks assembles tasks associated with a second predefined frequency of execution lower than the first frequency of execution, wherein, when the software module is nm, the execution of the tasks belonging to the first group is triggered by the first sequencer when each periodic timing signal is received, and wherein the execution of the tasks belonging to the second group is triggered periodically by the first sequencer, the tasks belonging to the second group having a lower priority than the tasks belonging to the first group.

6. The method according to claim 4, wherein the switching device is connected to an electrical installation for interrupting an AC electric current within said electrical installation, the frequencies of execution being chosen as a function of the frequency of the AC electric current.

7. The method according to claim 1, wherein a recovery strategy implemented during the recovery step in the case of violation of the service contract of a software module comprises the interruption of the running of the software module.

8. The method according to claim 1, wherein a recovery strategy implemented during the recovery step in the case of violation of the service contract of a software module is chosen according to a criticality value of the runnable code declared in the service contract of said software module.

9. A device for switching an electric current comprising:
   an embedded electronic computer designed to control operation of the switching device and intended to receive embedded software modules,
   wherein the embedded electronic computer comprises an assembly of host receptacles each intended to form an environment for running a software module, each receptacle comprising, a memory location defined statically inside of a memory of the electronic computer and being associated with a sub-assembly of hardware resources of the electronic computer,
   said electronic computer furthermore implementing a management system programmed to:
   a) acquire a software module comprising a runnable code and a service contract declaring hardware resources required by the runnable code,
   b) install the software module inside of one of the receptacles, and
   c) run the software module by the electronic computer, wherein when the software module is run further verifying whether the running of the software module complies with the service contract for said software module, execution being authorized to proceed when execution complies with the service contract and, when the execution of the software module is identified as not complying with the service contract, a recovery step is implemented with an aim of interrupting the running of the software module by the electronic computer.

10. The switching device according to claim 9, wherein the electronic computer is furthermore programmed to, before, verify the service contract of the software module, the installation of the software module being refused when the hardware resources required by the service contract are not compatible with the hardware resources offered by available receptacles.

* * * * *